(12) United States Patent
Natarajan et al.

(10) Patent No.: US 7,882,365 B2
(45) Date of Patent: Feb. 1, 2011

(54) SYSTEMS AND METHODS FOR DISTINGUISHING BETWEEN ACTUAL DATA AND ERASED/BLANK MEMORY WITH REGARD TO ENCRYPTED DATA

(75) Inventors: Venkat Natarajan, Cupertino, CA (US); Willy Obereiner, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1073 days.

(21) Appl. No.: 11/615,492

(22) Filed: Dec. 22, 2006

(65) Prior Publication Data
US 2008/0155275 A1 Jun. 26, 2008

(51) Int. Cl.
G06F 12/14 (2006.01)
H04L 29/06 (2006.01)
H04L 9/00 (2006.01)
G06F 7/04 (2006.01)
G06F 13/00 (2006.01)

(52) U.S. Cl. .............. 713/193; 713/165; 713/166; 713/167; 713/170; 713/171; 713/191; 713/192; 713/194; 726/1; 726/2; 726/4; 726/6; 726/26; 726/30; 726/34; 380/277; 711/100

(58) Field of Classification Search ............ 713/193, 713/165; 726/30; 380/277; 711/100
See application file for complete search history.

(56) References Cited

U.S. PATENT DOCUMENTS

| | | | |
|---|---|---|---|
| 5,444,664 A * | 8/1995 | Kuroda et al. ............ 365/226 |
| 5,991,519 A * | 11/1999 | Benhammou et al. .......... 726/3 |
| 2001/0019501 A1* | 9/2001 | Otani et al. ............ 365/185.29 |
| 2003/0051148 A1* | 3/2003 | Garney ........................ 713/189 |
| 2006/0101484 A1* | 5/2006 | Masumoto et al. ............ 725/25 |
| 2006/0259715 A1* | 11/2006 | Getzin et al. ................. 711/154 |
| 2006/0277359 A1* | 12/2006 | Faber ........................... 711/113 |
| 2007/0016799 A1* | 1/2007 | Klint et al. .................. 713/189 |
| 2009/0132777 A1* | 5/2009 | Kelly et al. .................. 711/163 |
| 2009/0150685 A1* | 6/2009 | Matsushima et al. ......... 713/194 |
| 2009/0323931 A1* | 12/2009 | Buer ............................ 380/28 |
| 2010/0077214 A1* | 3/2010 | Jogand-Coulomb et al. . 713/170 |

* cited by examiner

Primary Examiner—Edan Orgad
Assistant Examiner—Jenise E Jackson
(74) Attorney, Agent, or Firm—Turocy & Watson, LLP

(57) ABSTRACT

Systems and methods that facilitate processing data, such as by encryption/decryption, and storing and retrieving data to/from memory such that actual data can be distinguished from information associated with, or representative of, erased/blank memory locations. A processor can include a comparing component that compares information input to the processor to determine whether such information is associated with actual data, or associated with, or representative of, erased/blank memory locations. Information associated with, or representative of, an erased/blank memory location can be processed so that it can be interpreted as such by other components. If actual data is processed such that the comparing component interprets the processed data to be equivalent to an erased/blank memory location, then the data can be re-processed, so it is not interpreted as such, before being forwarded to its next destination.

19 Claims, 9 Drawing Sheets

SYSTEMS AND METHODS FOR DISTINGUISHING BETWEEN ACTUAL DATA AND ERASED/BLANK MEMORY WITH REGARD TO ENCRYPTED DATA

TECHNICAL FIELD

The subject invention relates generally to memory systems and in particular to systems and methods for distinguishing between actual data and erased/blank memory with regard to encrypted data.

BACKGROUND

With many electronic products, security of the data written to and read from memory is important. Examples of such products include portable devices such as cell phones, portable computers, voice recorders, and the like, as well as many larger electronic systems that are utilized in cars, planes, and industrial control systems. To improve security, a processor may be used to encrypt and decrypt data being transferred to and from memory.

Typically, when encrypting data, the processor encrypts data according to a specified algorithm. However, when certain data is encrypted, it may result in such data being encrypted such that it has a value equivalent to an erased or a blank memory location and would be read as erased or blank memory when, in fact, the information is actual data (e.g., data with a value different from that of erased or blank memory). Similarly, when a memory location has been erased or is blank, and an attempt is made to read this memory location and decrypt the information therein, such information may be decrypted such that it could be interpreted as actual data, when, in fact, the memory location had no actual data; that is, it contained information associated with erased or blank memory. As a result, it is difficult for software, when utilizing such information, to make a distinction between information associated with actual data and information associated with erased or blank memory.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

In one aspect of the disclosed subject matter, a host processor can be operatively coupled to a security processor and memory in a series connection so as to facilitate integrated security capabilities. The memory can store software, such as security software, and data, such as secured data. The security processor can encrypt information being written to memory and decrypt information being retrieved from memory. The security processor can also include a comparing component that can analyze information being input into the security processor to facilitate distinguishing between actual data, and information associated with erased/blank memory locations. Information associated with actual data that is being written to memory can be input into the comparing component, which can analyze the information and determine that it is associated with actual data. Such data can be encrypted and analyzed again by the comparing component. If the encrypted data does not have a value equivalent to a value associated with erased/blank memory information, then the encrypted data can proceed to be stored in memory. If the encrypted data does have a value equivalent to a value associated with erased/blank memory information, the encrypted data can be encrypted again, so that it no longer will have a value associated with erased/blank memory information, and can then proceed to be stored in memory. Similarly, decrypting of actual data being read from memory can be accomplished by inputting the information into the comparing component, and if the data has a value that is not equivalent to erased/blank memory information, then the data can be decrypted. The decrypted data can be compared again to see if it has a value equivalent to information associated with erased/blank memory information, and if so, it can be decrypted again. If not, the decrypted data can proceed to its next destination, such as the host processor, for example.

In another aspect of the disclosed subject matter, data being written to memory that has a value equivalent to that of an erased/blank memory location (e.g., bits are all ones in flash memory) can be processed by the security processor such that it is not erroneously interpreted when subsequently read from memory. For example, the comparing component can receive and then analyze such data. If the comparing component determines that the data has the same value as data stored in an erase block (e.g., where bits are set to all ones with regard to flash memory), the security processor can then transfer such data to the memory location without encrypting it, so that such data can be subsequently read from memory and interpreted as a representation of blank or erased memory. Similarly, when a read command is made with regard to an erased or a blank memory location, information associated with the erased/blank memory location can be input into the comparing component, where the comparing component can analyze such information and determine that it is associated with an erased/blank memory location. Such information can then be transferred to its next destination, such as the host processor, for example, without being decrypted, so that such information can be interpreted as information associated with erased/blank memory.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
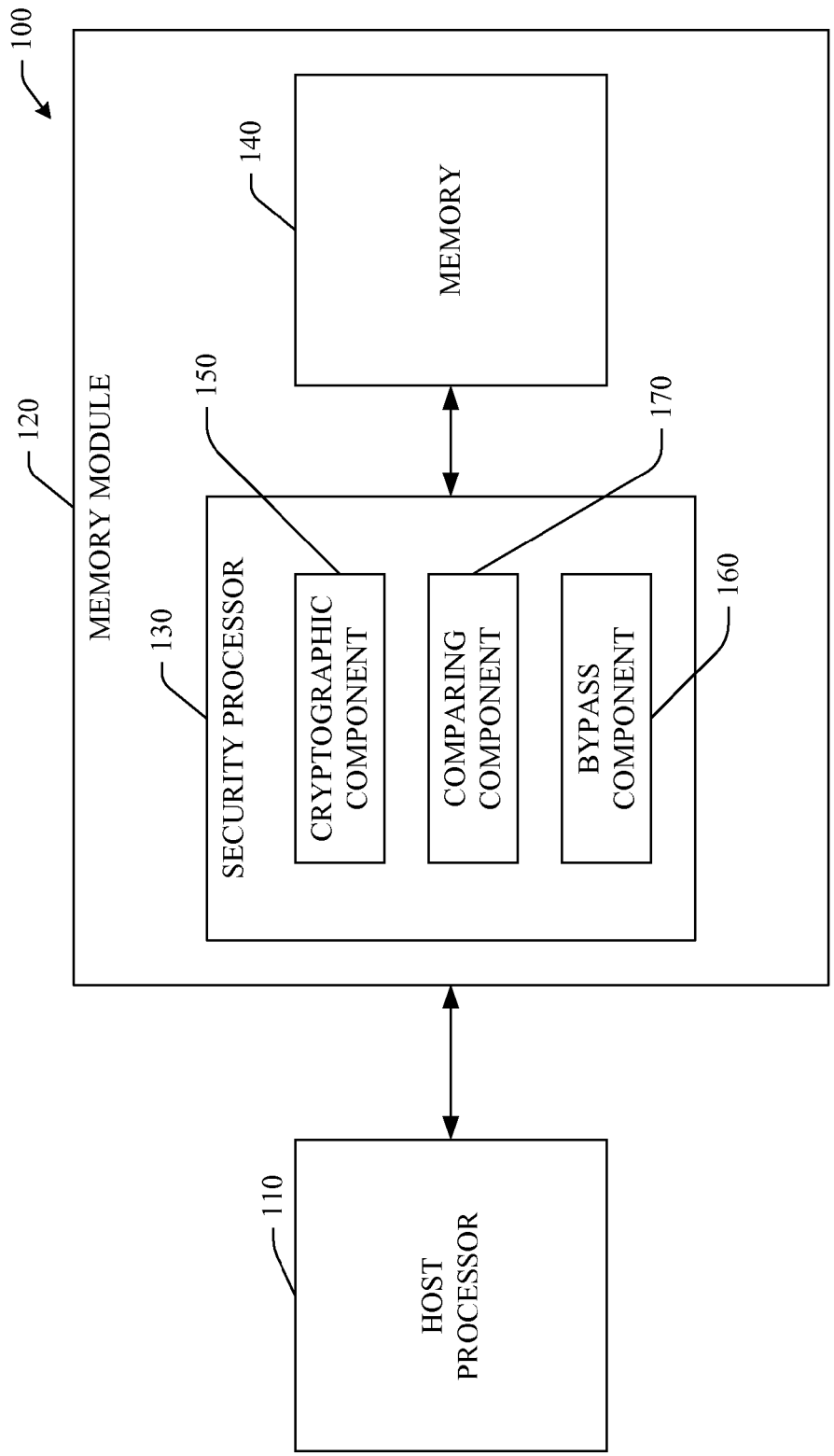
FIG. 1 illustrates a system that facilitates security of data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Typically, when encrypting data, the processor encrypts the data according to a specified algorithm. However, when certain data is encrypted, it may result in such data being encrypted such that it has a value equivalent to an erased or a blank memory location and could be erroneously read as erased or blank memory when, in fact, the information is actual data (e.g., data with a value that is not equivalent to the value of an erased/blank memory location). Similarly, when a memory location has been erased or is blank, and an attempt is made to read this memory location and decrypt the information therein, such information may be decrypted such that it could be erroneously interpreted as actual data, when, in fact, the memory location contained no actual data (e.g., information having a value equivalent to that of an erased or a blank memory location). As a result, it is difficult for software, when utilizing such data, to make a distinction between information associated with actual data and information associated with erased/blank memory or write operations where the data has a value representative of an erased/blank memory location. Accordingly, the disclosed subject matter optimizes processing of data so that, when data is processed, actual data can be distinguished from information associated with erased/blank memory locations, and facilitates a heightened level of security in user applications.

A host processor that can be operatively coupled to a security processor and memory in a series connection so as to facilitate integrated security capabilities, for example. The memory can store software, such as security software, and data, such as secured data. The security processor can encrypt information being written to memory and decrypt information being retrieved from memory. The security processor can include a comparing component that can analyze information input to the security processor to facilitate distinguishing between actual data and information associated with or representative of erased or blank memory locations. When it is determined that the information is associated with actual data, such data can be encrypted/decrypted and, if necessary, that encrypted/decrypted data can be encrypted/decrypted again, so that the actual data will be interpreted as actual data when stored in memory or read from memory. Also, information associated with or representative of an erased/blank memory location can be analyzed by the comparing component so that the security processor knows that it is such information, and such information can be processed by the security processor without decrypting the information so that it will be interpreted as an erased/blank memory location by the host processor, for example.

Now turning to FIG. 1, a system 100 that facilitates security of data is illustrated. The system 100 can include a host processor 110, which can be a typical applications processor that can manage communications and run applications. The host processor 110 can be a baseband processor for a mobile handset, personal data assistant (PDA), or the like. The host processor 110 can be associated with a memory module 120 that can include a security processor 130 that facilitates securing data being written to and read from memory 140. In one embodiment, the host processor 110 can eXecute In Place (XIP) enabling the host processor 110 to execute code directly from the memory 140. In another embodiment, the memory module 120, including the security processor 130 and memory 140, can be situated on a single chip, for example. The memory module 120 can be configured such that the host processor 110 can be connected in series with the security processor 130 positioned between the host processor 110 and the memory 140 via a split or shared bus to facilitate integrated security capabilities and efficiency. It is to be appreciated that, while the host processor 110, security processor 130, and memory 140 are configured in series, the claimed subject matter is not so limited and can be configured in any way that can facilitate the processing of data as claimed and disclosed herein.

The memory 140 can include volatile memory (e.g., random access memory (RAM), static RAM (SRAM), and the like) and non-volatile memory (e.g., read only memory (ROM), programmable ROM (PROM), flash, and the like).

The security processor 130 can include a cryptographic component 150 capable of performing cryptography processes, such as encryption or decryption of data, to provide security capabilities, as described in more detail infra. The security processor 130 can further include a bypass component 160 that, when selected or enabled, can allow data and other information to flow through the security processor 130, so the host processor 110 can access the memory 140 directly without any processing or interference by the security processor 130. In the bypass mode, the security processor 130 is, in effect, "transparent" to the host processor 110 and memory 140, as the data and other information flows on the shared or split bus to/from the host processor 110, through a system bus (not shown) of the security processor 130, and from/to memory 140. For example, the bypass component 160 can be selected or enabled to put the security processor 130 into bypass mode when the host processor 110 is performing memory reads (e.g., instruction fetch, data) or writes involving instructions and/or data or other information that are not secured, such as application programs, etc.

When the bypass component 160 is not selected or enabled, the security processor 130 can access the memory 140 via the split or shared bus. The host processor 110 can provide the signal timing to both the security processor 130 and memory 140. Thus, the host processor 110 can control when data is moved in/out of the memory from/to the security processor 130. An aspect of the claimed subject matter is that the host processor 110 can "move" data to and from the memory 140 without the host processor 110 actually making a copy of the memory data. This architecture can thereby enhance the security of the system and simplify the design of the interface, as well as obviate the need for a separate bus arbiter, as the host processor 110 arbitrates access to the memory bus. Accordingly, the host processor 110 and the security processor 130 coordinate read/write access to the memory 140 so as to optimize processor/memory utilization while ensuring a heightened level of security.

The security processor 130 can also include a comparing component 170 that can receive information inputted to the security processor 130 and analyze such information to determine how the information will be managed by the security processor 130. For example, the comparing component 170 can analyze information being input into the security processor to facilitate distinguishing between actual data and information associated with erased/blank memory locations. During a write operation associated with the security processor 130, data being written to memory can be input into the comparing component 170, which can analyze data and determine that it is actual data (e.g., data with a value that is not equivalent to that of erased/blank memory). Such data can be encrypted by the cryptographic component 150 and then analyzed again by the comparing component 170. If the encrypted data does not have a value equivalent to a value associated with erased/blank memory information, then the encrypted data can proceed to be stored in memory 140. If the encrypted data does have a value equivalent to a value associated with erased/blank memory information (e.g., bits are all ones with regard to flash memory), the encrypted data can be encrypted again by the cryptographic component 150, so that it no longer will have a value associated with erased/blank memory information (e.g., bits will have a value that is not all ones with regard to flash memory), and can then proceed to be stored at the specified memory location in memory 140. Similarly, actual data being read from memory 140 can be received by the comparing component 170, and if the data has a value that is not equivalent to erased/blank memory information, then the data can be decrypted by the cryptographic component 150. The decrypted data can be compared again by the comparing component 170 to see if it has a value equivalent to information associated with erased/blank memory information, and if so, it can be decrypted again by the cryptographic component 150. If the decrypted data does not have a value equivalent to information associated with erased/blank memory information, the decrypted data can proceed to its next destination, such as the host processor 110, for example.

Information associated with a write operation where the information has a value equivalent to a value associated with an erased/blank memory location can also be processed by the security processor 130 such that the information will not be erroneously interpreted as actual data (e.g., data that has a value that is not equivalent to that of erased/blank memory). For example, with regard to flash memory, where a write operation will cause all bits in a specified memory address to be set to ones, the comparing component 170 can facilitate mapping all ones, as generated by the host processor in association with the write operation, to all ones as the information is sent from the security processor 130 to be stored in the memory 140 at the specified memory address.

Similarly, when a read command from the host processor 110 is made from an erased or a blank memory location, information associated with the erased/blank memory location can be read from memory 140 and input into the comparing component 170, where the comparing component 170 can analyze such information and determine that it is associated with an erased/blank memory location in the memory 140. Such information can then be processed without being decrypted by the security processor 130, and then transferred to its next destination, such as the host processor 110, for example, so that such information can be interpreted as information associated with an erased/blank memory location by the host processor 110. For example, with regard to flash memory, where an erased or a blank memory has all bits in a specified memory address set to ones, the comparing component 170 can facilitate mapping all ones from the specified memory address in memory 140 associated with the read command generated by the host processor 110 to all ones as the information is sent from the security processor 130 to the host processor 110, for example, to perform the read from the specified memory address, as the decryption algorithm can be modified when a read operation with regard to an erased or a blank memory address is encountered.

The memory 140 can have a separate memory addresses to which data can be stored. The memory 140 can also be partitioned into two or more partitions, such that the host processor 110 can access the host partition(s) (not shown) in the memory 140 and the memory addresses contained within that partition(s), and the security processor 130 can access the security processor partition(s) (not shown) in the memory 140 and the memory addresses contained within that partition(s). The partitions can be dynamic, as the partitions can either be fixed or programmable at run time, and the host processor 110 and security processor 130 can each know what their respective partitions are as well as the respective memory addresses associated therewith. For example, the host processor 110 can access its respective memory partition (not shown) in the memory 140 via the memory bus, through the system bus (not shown) of the security processor, and can store data and other information in that partition. Further, the memory partition (not shown) dedicated to the security processor 130 can store secured data, and the security processor 130 can access the secured data via the memory bus.

It is to be appreciated that, while references are made herein to "actual" or "valid data," such references to actual or valid data are made to distinguish between data or information that has a value that is not equivalent to a value associated with an erased or a blank memory location (e.g., data with a value different from that associated with erased or blank memory), which is referred to as "actual" or "valid" data herein, as opposed to data or information that has a value equivalent to a value associated with an erased or a blank memory (e.g., in a flash memory, the bits in the memory location are all set to ones). Data or information that has a value equivalent to that associated with an erased or a blank memory is not improper data, or data that is not useable, but rather is data that, when read from memory, for example, can be interpreted as data associated with erased or blank memory.

Figure 2:
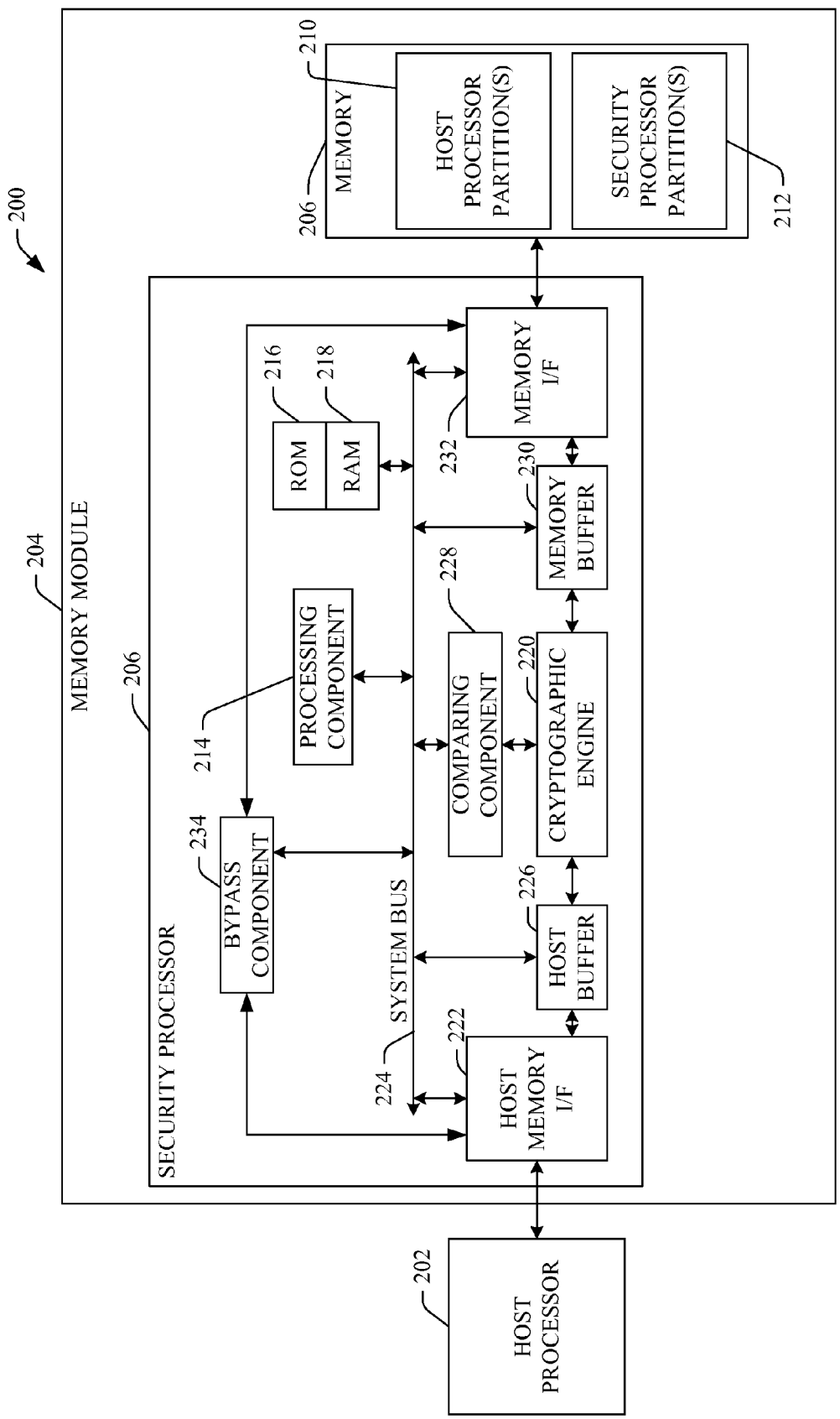
FIG. 2 provides a more detailed depiction of a system that facilitates security of data in accordance with an aspect of the subject matter disclosed herein.

In more detail, FIG. 2 illustrates a system 200 that facilitates security of data. The system 200 can include a host processor 202, which can be a typical applications processor that handles communications and runs applications. The host processor 202 can be a baseband processor for a mobile handset, PDA, or the like. The host processor 202 can be associated with memory module 204, which can include a security processor 206 that can facilitate performing secure operations with regard to data and memory 208. The host processor 202 can be connected in series with the security processor 206 and memory 208 via a shared or split memory bus, such that the security processor 206 is positioned in between the host processor 202 and memory 208 in the series connection. The memory 208 can be comprised of one or more host processor partitions 210 that can be associated with the host processor 202, and one or more security processor partitions 212 that can be associated with the security processor 204. Further, the memory 208 can include volatile memory (e.g., RAM, SRAM, and the like) and non-volatile memory (e.g., ROM, PROM, flash, and the like).

The memory module 204 can include security software including password authentication software, shared key authentication software, public key infrastructure (PKI) authentication software, integrity check software, encryption/decryption software, anti-virus software, anti-spyware software, secure communication software, and any other type of security software available. The security software can be directly embedded into the memory 208 to provide integrated security capabilities within the memory module 204. The security processor 206 can access the security software from the memory 208 and perform security functions based on the specific security software stored. The security processor 206 can control the entire memory storage and monitor all traffic to and from the memory 208.

The memory module 204 can also provide for authentication services and secure channel communications based on this heightened level of security it has established. Authentication services and secure channel communications can be utilized in a variety of applications to create a secure environment. For example, the memory module 204 can provide security for secure partitioning, secure boot, virus rollback, firmware over the air update (FOTA), near field communication (NFC) secure payment, digital rights management, enterprise remote data management and mobile TV broadcasting.

Authentication services utilized by the memory module 204 can include password authentication, shared key authentication and PKI authentication, for example. These authentication services can be used in association with three types of authentication. Type 1 is authenticating a user to the secure flash memory, type 2 is authenticating a host processor to the secure flash memory and type 3 is authenticating a server to the secure flash memory. Further, authentication applications may require secure channel communications. The memory module 204 can provide for two types of secure channel communications used in association with the authentication services. Type 1 establishes a secure channel of communication from a host processor to the flash memory and type 2 establishes a secure channel of communication from a back end server to the flash memory.

The security processor 206 can include a processing component 214 or any other type of low power application processor. The processing component 214 can provide a secure environment to implement authentication algorithms and security software. However, as described infra, the timing associated with the reading or writing of data to the memory 208 by the security processor 206 can be derived from and controlled by the host processor 202. Generally, the processing component 214 can only have control over certain functions associated with the security processor 206 when the host processor 202 is not accessing the memory 208. As shown, the security processor 206 cannot have access to the memory bus and thus the memory 208 unless it receives a read or write cycle associated with the security processor 206 that is generated by the host processor 202.

Processing component 214 can execute various applications that can facilitate and effectuate partitioning of the memory 208, ascertain whether access can be granted to entities requesting access to particular partitions, determine in concert with the host processor 202 whether authentication supplied by a requesting entity comports with corresponding authentication information that can be stored in associated ROM 216, RAM 218, and/or memory component 208, and can facilitate the encryption and decryption of data that is communicated between the host 202 and security processor 206 to ensure against phishing and man-in-the middle attacks, for example. In addition, processing component 214 can configure the cryptographic component 220, discussed in more detail, infra, and can control data flow through security processor 206.

However, it is to be appreciated that, while the host processor 202, security processor 206, and memory 208 are configured in series, the claimed subject matter is not so limited and can be configured in any way that can facilitate the processing of data as claimed and disclosed herein. Further, while, as shown, the host processor 202 arbitrates access to the memory 208 for the host 202 and security processor 206, it is to be appreciated that the claimed subject matter is not so limited and can be configured in any way that can facilitate the processing of data as claimed and disclosed herein.

Security processor 206 can also include a host memory interface (I/F) 222 that can be associated with system bus 224 and can handle all memory transactions with the host processor 202. Specifically, the host memory I/F 222 can manage signaling, thus complying with the interface definitions of the memory 208. The host memory I/F 222 also can manage interpreting or differentiating between a secure and non-secure request, and monitoring requests via enforcing access rights and permissions associated with the security processor 206.

The security processor 206 can include a host buffer 226 that can be associated with the host memory I/F 222 and can hold data associated with secured transactions to and from the host processor 202. The host buffer 226 also can serve as a mailbox between the processing component 214 and the host processor 202, wherein interpretation of the messages is carried out by the processing component 214. The security processor 206 can include a cryptographic component 220 that can be associated with the host buffer 226 and system bus 224 and perform all the cryptographic algorithms, symmetric and asymmetric, or the like, needed by the system 200. The cryptographic component 220 can include one or more buffers (not shown) that can be utilized by the cryptographic component 220 when performing its operations. The processing component 214 can configure the cryptographic component 220 and control data flow through the security processor 206. The processing component 214 can interface the system bus 224 and the security applications that run on the processing component 214, arbitrating with the host processor 202. The security processor 206 can further include a comparing component 228, that can also be associated with the cryptographic component 220, and that can compare data and other information that is input into the security processor 206 to distinguish between actual data and information associated with erased/blank memory or otherwise having a value equivalent to that of an erased/blank memory block, as discussed in more detail, infra. The security processor 206 can also include a memory buffer 230 that can be associated with the system bus 224 and cryptographic component 220, and can hold data associated with secured transactions as the data proceeds to and from the memory 208. Further, the security processor 206 can include a memory I/F 232 that can be associated with the system bus 224 and memory buffer 230, and can handle all transactions to and from the memory 208 and the security processor 206, such as signaling and interpretation.

As stated, the security processor 206 can include a comparing component 228 that can receive information inputted to the security processor 206 and analyze such information to determine how the information will be managed by the security processor 206. For example, the comparing component 228 can analyze information being input into the security processor to facilitate distinguishing between actual data and information associated with erased/blank memory locations or otherwise having a value equivalent to that of an erased/blank memory location. During a write operation associated with a secured partition 212 in memory 208, data being written to memory 208 can be input into the comparing component 228, which can analyze data and determine that it is actual data (e.g., data with a value that is not equivalent to an erased/blank memory location). Such data can be encrypted by the cryptographic component 220 and analyzed again by the comparing component 228. If the encrypted data does not have a value equivalent to a value associated with erased/blank memory information, then the encrypted data can proceed to be stored in the designated memory address in secured partition 212. If the encrypted data does have a value equivalent to a value associated with erased/blank memory information, the encrypted data can be encrypted again by the cryptographic component 220, so that it no longer will have a value associated with erased/blank memory information, and can then proceed to be stored in the specified memory location in secured partition 212. Similarly, during a read operation associated with a secured partition 212 in memory 208, actual data being read from memory 208 can be received by the comparing component 228, and if the data has a value that is not equivalent to that associated with erased/blank memory information, then the data can be decrypted by the cryptographic component 220. The decrypted data can be compared again by the comparing component 228 to see if it has a value equivalent to information associated with erased/blank memory information, and if so, it can be decrypted again by the cryptographic component 220. If not, the decrypted data can proceed to its next destination, such as the host processor 202, for example.

Information, associated with a write operation, that has a value equivalent to a value for an erased/blank memory location can also be processed by the security processor 206 such that it will not be erroneously interpreted as actual data (e.g., data that has a value that is not equivalent to a value associated with an erased or blank memory location). For example, when host processor 202 generates a write operation associated with a memory address in a security processor partition 212, the security processor 206 can receive information associated with the write operation from the host processor 202. Such information can then be analyzed by comparing component 228. If the comparing component 228 determines that the information has a value that is equivalent to the value associated with an erased/blank memory location, the security processor 206 can transfer (e.g., with the timing for such transfer derived from the host processor 202) such information to the specified memory location in the secured partition 212 without encrypting it, so that such information can be subsequently read from the secured partition 212 and interpreted as having a value representative of an erased or blank memory location. Similarly, when host processor 202 generates a read command associated with a memory address in a secured memory partition 212, and the read command is made from an erased or a blank memory location, information associated with the erased/blank memory location can be read from the secured partition 212 and input into the comparing component 228, where the comparing component 228 can analyze such information and determine that it is associated with an erased or blank memory location in the secured partition 212 of memory 208. Such information can then be processed without being decrypted by the security processor 206, and then transferred to its next destination, such as the host processor 202, for example, so that such information can be interpreted as information associated with an erased/blank memory location.

As an example, the host processor 202 can generate a write command associated with a memory address in a secured partition 212 of the flash memory 208. Data associated with the write command can be input to the security processor 206 via the host memory I/F 222 and stored in the host buffer 226. The data can then be input to the comparing component 228 where it can be analyzed to determine whether it is actual or valid data, as opposed to information that has a value equivalent to a value of an erased or blank memory block (e.g., where all bits would be set to one in flash memory). Since the data is actual data, the comparing component 228 will determine that this is so, and the data can then be input to the cryptographic component 220 to be encrypted. After the data is encrypted, the encrypted data can then be input to the comparing component 228 again to determine whether the value of the encrypted data has a value that is the same as that associated with erased or blank memory (e.g., where all bits would be set to one in flash memory). If so, the encrypted data can be sent back to the cryptographic component 220 to be encrypted again. The encrypted data can then be transferred to the memory buffer 230, and thereafter sent to memory 208 via the memory I/F 232 and written to the specified address in the secured memory partition 212.

Further, the host processor 202 can also generate a read command associated with a memory address in a secured partition 212 in flash memory 208. Information stored in the specified memory address can be read and input to the security processor 206 via the memory I/F 232 and stored in the memory buffer 230, for example. The information can be transferred from the memory buffer 230 to the comparing component 228, where the comparing component 228 can analyze the data to determine whether it is information associated with actual data or information associated with erased/blank memory (e.g., bits set to all ones in flash memory). If the information is associated with erased or blank memory, then the information can be transferred to its destination, such as the host processor 202, for example, without being decrypted in the cryptographic component 220. If the information is associated with actual or valid data, then the comparing component 228 can input the information to the cryptographic component 220, where the data can be decrypted. The decrypted data can then be sent to the comparing component 228 and analyzed to determine whether the data has a value that would be perceived as information associated with erased/blank memory. If so, it can be sent back to the cryptographic component 220 and decrypted again, and then sent to its destination, the host processor 202, for example. If the decrypted data does not have a value equivalent to that associated with erased/blank memory, then the decrypted data does not need to be decrypted again, and the comparing component 228 can forward the decrypted data to its destination.

As further example, the host processor 202 can generate write operation to a specified memory address in a secured partition 212 in flash memory 208. The information associated with the write operation can be input to the security processor 206 via the host memory I/F 222 to the host buffer 226. Such information can then be input into the comparing component 228 where the comparing component 228 can determine whether the information is actual data or information that has a value equivalent to that associated with an erased or blank memory block (e.g., bits are all ones in flash memory address). If the information has a value equivalent to a value associated with an erased/blank memory block, the information can be transferred from the comparing component 228 to the memory buffer 230, for example, without encryption. The erase command information can be sent via memory I/F 232 to the specified memory address in a secured partition 212 in flash memory 208, where the information can be stored.

The security processor 206 can further employ a bypass component 234 that can be associated with the system bus 224, host memory I/F 222, and memory I/F 232, and when selected or enabled can allow data and other information to flow through it via system bus 224, so the host processor 202 can access the memory 208 directly without any processing or interference by the security processor 206. The bypass component 234 can be a co-processor, for example, such as a simple co-processor that is able to receive memory address data, and select or enable the bypass mode when the memory address in the read/write cycle is associated with the host processor 202, or de-select or disable the bypass mode when the memory address is associated with the security processor 206. In the bypass mode, the security processor 206 is essentially "transparent" to the host processor 202 and memory 208, as the data and other information flows via the shared or split bus to/from the host processor 202, through the security processor 206, via system bus 224 and from/to the memory 208 via the memory bus associated therewith. For example, the bypass component 234 can be selected or enabled to put the security processor 206 into bypass mode when the host processor 202 is performing memory reads or writes associated with the host processor 202 that involve instructions, or data or other information that are not secured, such as with regard to application programs, etc.

When the bypass component 234 is de-selected or not enabled, the security processor 206 can access the memory 208 via the shared memory bus. It is to be understood that the host processor 202 still provides the signal timing to both the security processor 206 and memory 208 to control the security processor's 206 access to the memory bus, and thus the memory 208. Thus, the host processor 202 can control when data is moved in/out of the memory 208 from/to the security processor 206, as well as moved between internal components (e.g., cryptographic component 220, memory buffer 230) of the security processor 206. An aspect of the claimed subject matter is that the host processor 202 can "move" data to and from the memory 208 without the host processor 202 actually making a copy of the memory data. This architecture can thereby enhance the security of the system as well as simplify the design of the interface.

As stated, the memory 208 can also be partitioned into more than one partition, such that the host processor 202 can access one or more host partitions 210 in the memory 208 and the memory addresses (not shown) contained within the respective partitions 210, and the security processor 206 can access one or more security processor partitions 212 in the memory 208 and the memory addresses (not shown) contained within the respective partitions 212. The partitions 210, 212 can be dynamic, and can be fixed or programmable at run time, and the host processor 202 and security processor 206 can each know what their respective partitions are as well as the respective memory addresses associated therewith. For example, the host processor 202 can access its respective memory partition(s) 210 and can store data and other information associated with the host processor 202 in its designated partition(s) 210. Further, the security processor partition(s) 212 dedicated to the security processor 206 can store security software and data, and the security processor 206 can access the security software and data, and can perform security functions based on the specific security software stored.

In another aspect of the claimed subject matter, the host processor 202 can XIP enabling it to execute code directly from the memory 208. Since the host processor 202 can XIP, it must have access to the memory 208 to perform memory reads or writes associated with the host processor 202, otherwise the host processor 202 will crash. Further, the security processor 206 must be able to access the memory 208 to carry out its security processing functions. However, as stated, supra, to facilitate increased security and efficiency, the system 200 can be constructed so that the host processor 202 is in series with the security processor 206, positioned between the host processor 202 and the memory 208, which has only one channel (memory bus) of access to it.

To permit both the host processor 202 and the security processor 206 to have access to the memory 208 via a single channel (memory bus), the host processor 202 and security processor 206 can be implemented in a master-slave type relationship. The host processor 202 can be employed as the "master" and can control the security processor 206 ("slave"). Further, the security processor 206 can be implemented as a finite state machine, for example. As stated, supra, the timing for all operations can be derived from the host processor 202. As the host processor 202 XIPs, it will be performing memory reads or writes, in accordance with read or write cycles associated with, and generated by, the host processor 202, and executions, associated with its host processing functions. At certain times specified by the host processor 202 when the host processor 202 wants the security processor 206 to perform some function(s), the host processor 202 can generate a write cycle or read cycle associated with the security processor 206 that will be sent to the security processor 206 and memory 208 to let the security processor 206 know that it can access the memory 208 to perform a task associated with its security processing functions. When a read cycle or write cycle associated with the security processor 206 is generated by the host processor 202, the bypass component 234 can be de-selected or disabled to take the security processor 206 out of its "transparent" bypass mode and allows the security processor 206 to access the memory 208 and perform read or write operations, and security processing (e.g., encryption/decryption), associated with its security processing operations. This architecture thereby obviates the need for a separate bus arbiter, as the host processor 202 arbitrates access to the memory bus. Accordingly, the host processor 202 and the security processor 206 coordinate read/write access to the memory 208 so as to optimize processor/memory utilization while ensuring a heightened level of security.

Figure 3:
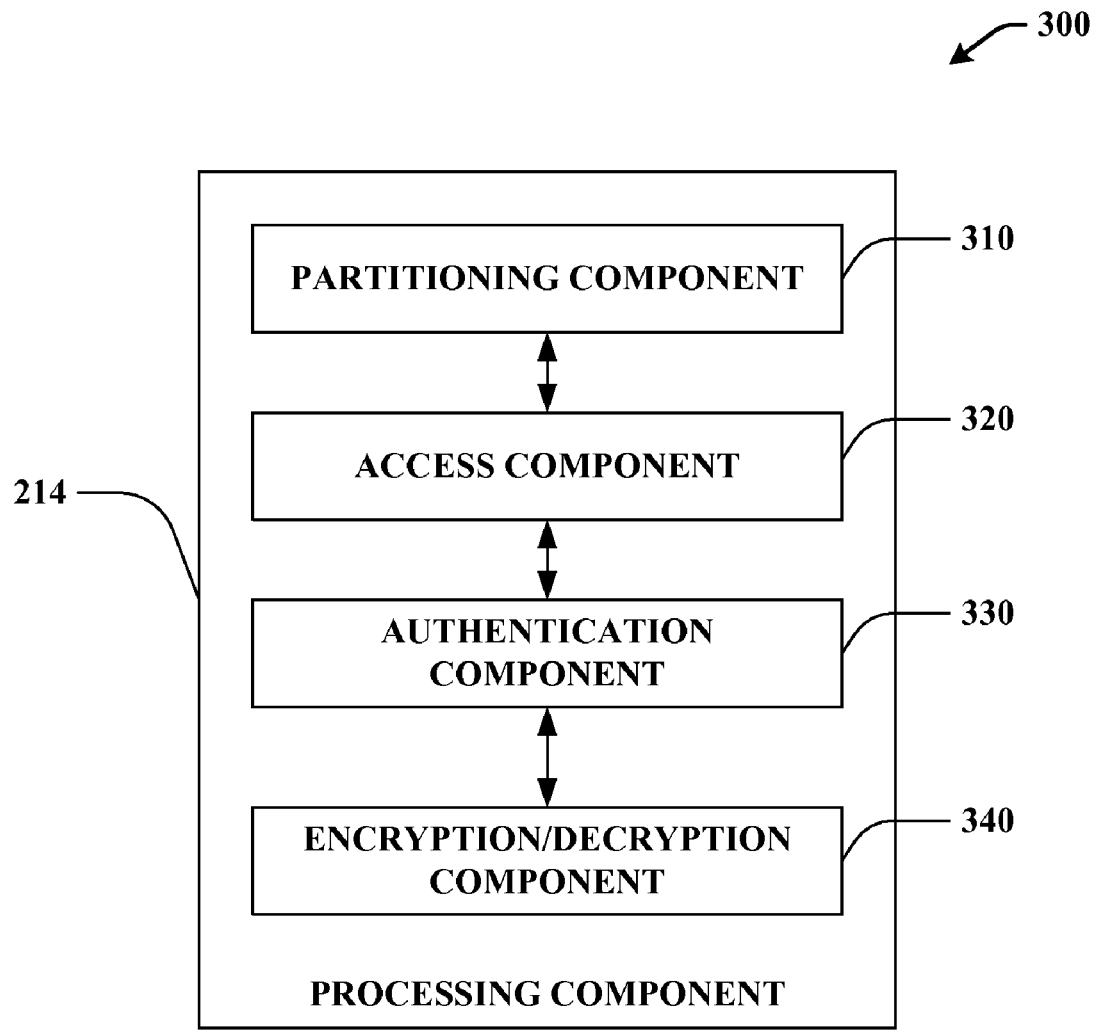
FIG. 3 provides a more detailed depiction of a processing component in accordance with another aspect of the disclosed subject matter.

FIG. 3 provides a more detailed depiction 300 of processing component 214. Illustrated therein processing component 214 can include a partitioning component 310 that can facilitate and effectuate partitioning of memory 208, an access component 320 that can ascertain and determine in concert with associated ROM 216 and/or RAM 218 and one or more internal registers (not shown) associated with memory module 204 whether or not an entity attempting to access a particular partition has been assigned, or has appropriate, access rights to be granted access to that partition, an authentication component 330 that can elicit sufficient authentication information from an entity to ensure the identity of the entity requesting access to a particular partition, and an encryption/decryption component 340 that can facilitate the encryption/decryption of data communicated between the host processor 202 and the security component 206.

Partitioning component 310 can divide the memory component 208 into multiple partitions. A partition can be created by specifying an identifier (e.g., GUID) that can be associated with the location of the memory component 208, the start address from whence the partition should commence, and an end address within the memory component 208. Since a created partition can typically span over multiple erase units the start and end addresses can be rounded to erase units. Moreover, since a partition can typically exist in one of two states, "open" or "closed", partitioning component 310 can, upon appropriate command being issued, change the state. Thus, where a partition is in an "open" state, partitioning component 310 can, upon receipt of a command and with proper authentication, close the partition. Conversely, where a partition is set to a "closed" state, partitioning component 310 can place the partition in an "open" state upon receipt of an appropriate command and with proper authentication.

Access component 320 can assign and determine access types and rights to partitions created by partitioning component 310. Typically access types that can be assigned by the access component 320 to a partition can include, but are not limited to, "read", "write", and "change access right". Further, access component 320 can also assign and ascertain access permissions associated with a partition. Access permissions can include one of: "ALWAYS, WHEN_OPEN, WITH_PKI, or WHEN_OPEN_OR_WITH PKI", wherein access permission "ALWAYS" indicates that access to a partition is always allowed, "WHEN_OPEN" indicates that access to the partition is allowed only when a partition is in an "open" state, "WITH_PKI" denotes that access to a partition is permitted only when appropriate PKI (Public Key Infrastructure) authentication information has been supplied, and "WHEN_OPEN_OR_WITH PKI" connotes that access is allowed when a partition is in an "open" state or when appropriate PKI authentication information has been supplied.

In addition, access component 320 can further set partition attributes on the "change access right" access type to: "ALWAYS", "WITH_PASSWORD", "WITH_PKI", and "WITH_PASSWORD_OR_WITH_PKI", wherein a "change access right" attribute set to "ALWAYS" is indicative that access rights on a partition can always be changed, "WITH_PASSWORD" denotes that access rights can only be changed when an appropriate password is supplied by the entity requesting the change, "WITH_PKI" indicates that access rights to the partition can only be changed when appropriate PKI authentication information is supplied by the entity requesting the change, and "WITH_PASSWORD_OR_WITH_PKI" requires that the entity requesting the access change supply either an appropriate password or relevant PKI authentication information.

Authentication component 330 can receive and retrieve credential information (such as biometric information and/or password information) associated with an entity attempting to access one or more memory partitions. In addition authentication component 330 can manage and maintain credential information which can be stored in associated ROM 216 and/or RAM 218, and/or alternative such credential information can also be stored in one or more of the memory component 208. In addition to merely receiving credential information, authentication component 330 can also solicit additional credential information where the authentication component 330 deems such information may be necessary to appropriately establish the identity of the entity seeking access to a particular partition. Upon receipt of credential information from an entity, authentication component 330 can consult with stored credential information (e.g., in associated ROM 216, RAM 218, and/or memory component 208), and, upon identifying a correspondence between the supplied credential information and the stored credential information, can grant and/or indicate to access component 320 the appropriate access that should be accorded to the requesting entity.

Encryption/decryption component 340 can facilitate the utilization of one or more encryption/decryption facilities to ensure that communications between the security processor 206 and the host processor 202 are not compromised by one of the many malicious extant viruses. The encryption/decryption component 340 can utilize one or more encryption/decryption mechanisms to obscure data communicated between security processor 206 and the host processor 202. Examples of encryption/decryption mechanisms that can be employed to obscure the data can include utilization of hashing algorithms, public key encryption, elliptic curve encryption, and the like.

Figure 4:
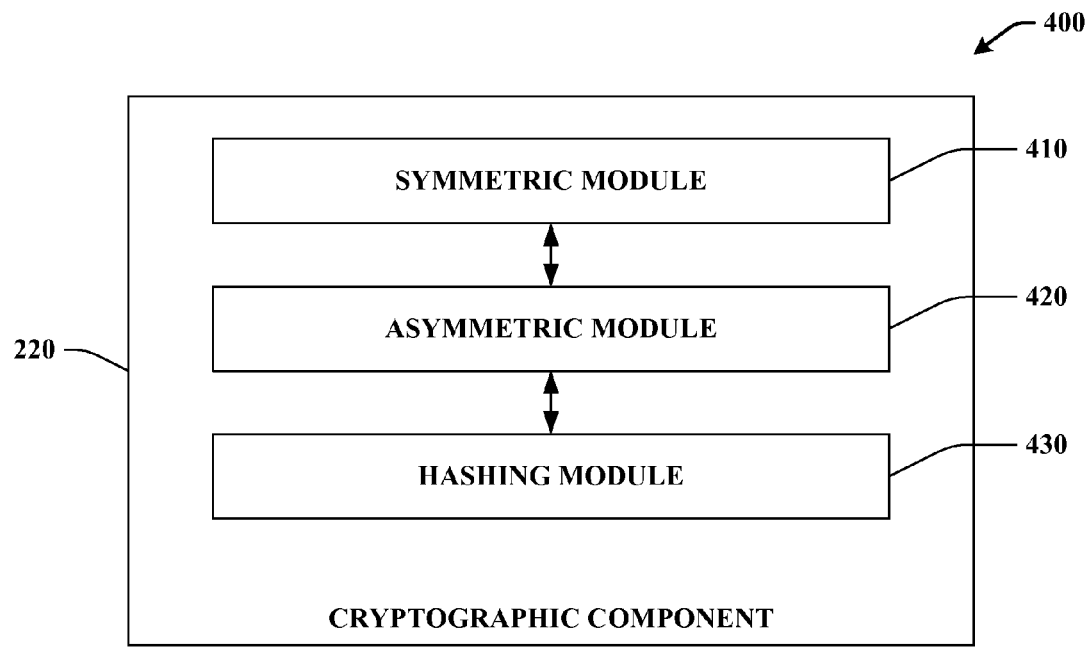
FIG. 4 provides a more detailed block diagram of a cryptographic component that can be included with an aspect of the disclosed subject matter.

FIG. 4 provides a more detailed illustration 400 of cryptographic component 220. As illustrated, cryptographic component 220 can include symmetric module 410 that provides symmetric cryptographic tools and accelerators (e.g., Twofish, Blowfish, AES, TDES, IDEA, CAST5, RC4, etc.) to ensure that a specified partition in memory component 208, or portions thereof, can only be accessed by those entities authorized and/or authenticated to do so. Cryptographic component 220 can also include asymmetric module 420 that provides asymmetric cryptographic accelerators and tools (e.g., Diffie-Hellman, Digital Signature Standard (DSS), Elliptical Curve techniques, RSA, IKE, PGP, and the like) to ensure that a specified partition in memory component 208, or portions thereof, are only accessed by those entities that are authorized and certified to do so. Additionally, cryptographic component 220 can include hashing module 430 that, like symmetric module 410 and asymmetric module 420, can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 208 is confined to those entities authorized to gain access.

Figure 5:
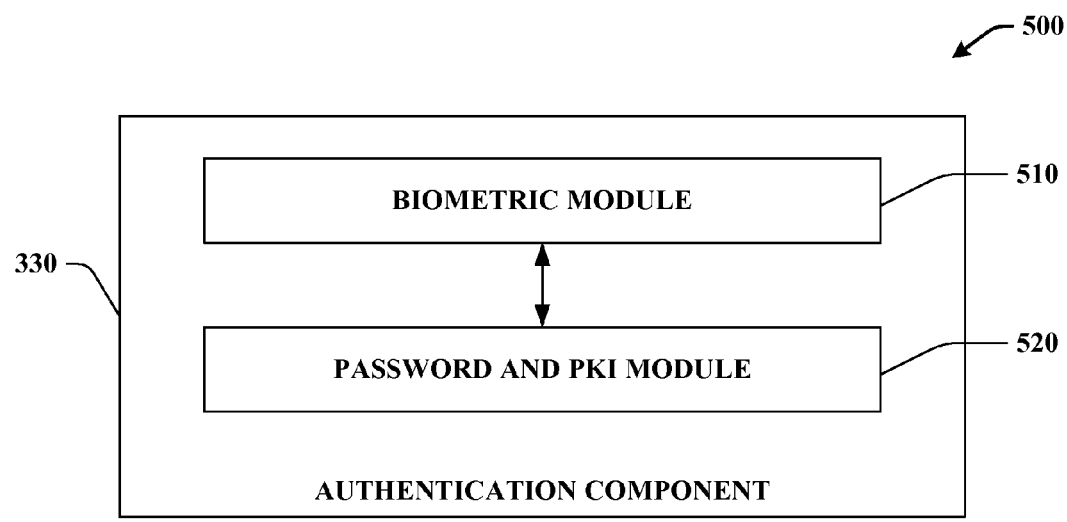
FIG. 5 provides a more detailed depiction of an authentication component in accordance with the disclosed subject matter.

FIG. 5 provides a more detailed depiction 500 of authentication component 330. Authentication component 330 can include a biometric module 510 and password and PKI module 520. Biometric module 510 can implement one or more machine implemented methods to identify an entity by its unique physical and behavioral characteristics and attributes. Biometric modalities that can be employed by biometric module 510 can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an iris of an entity, and finger print identification that scans the corrugated ridges of skin that are non-continuous and form a pattern that can provide distinguishing features to identify an entity.

Password and PKI module 520 can solicit authentication data from an entity, and, upon the authentication data so solicited, can be employed, individually and/or in conjunction with information acquired and ascertained by the biometric module 510, to control access to memory 208. The authentication data can be in the form of a password (e.g. a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g. Personal Identification Number (PIN)), and the like. Additionally and alternatively, PKI data can also be employed by password and PKI module 520. (PKI arrangements provide for trusted third parties to vet, and affirm, entity identity through the use of public keys that typically are certificates issued by the trusted third parties. Such arrangements enable entities to be authenticated to each other, and to use information in certificates (e.g., public keys) to encrypt and decrypt messages communicated between entities.

Figure 6:
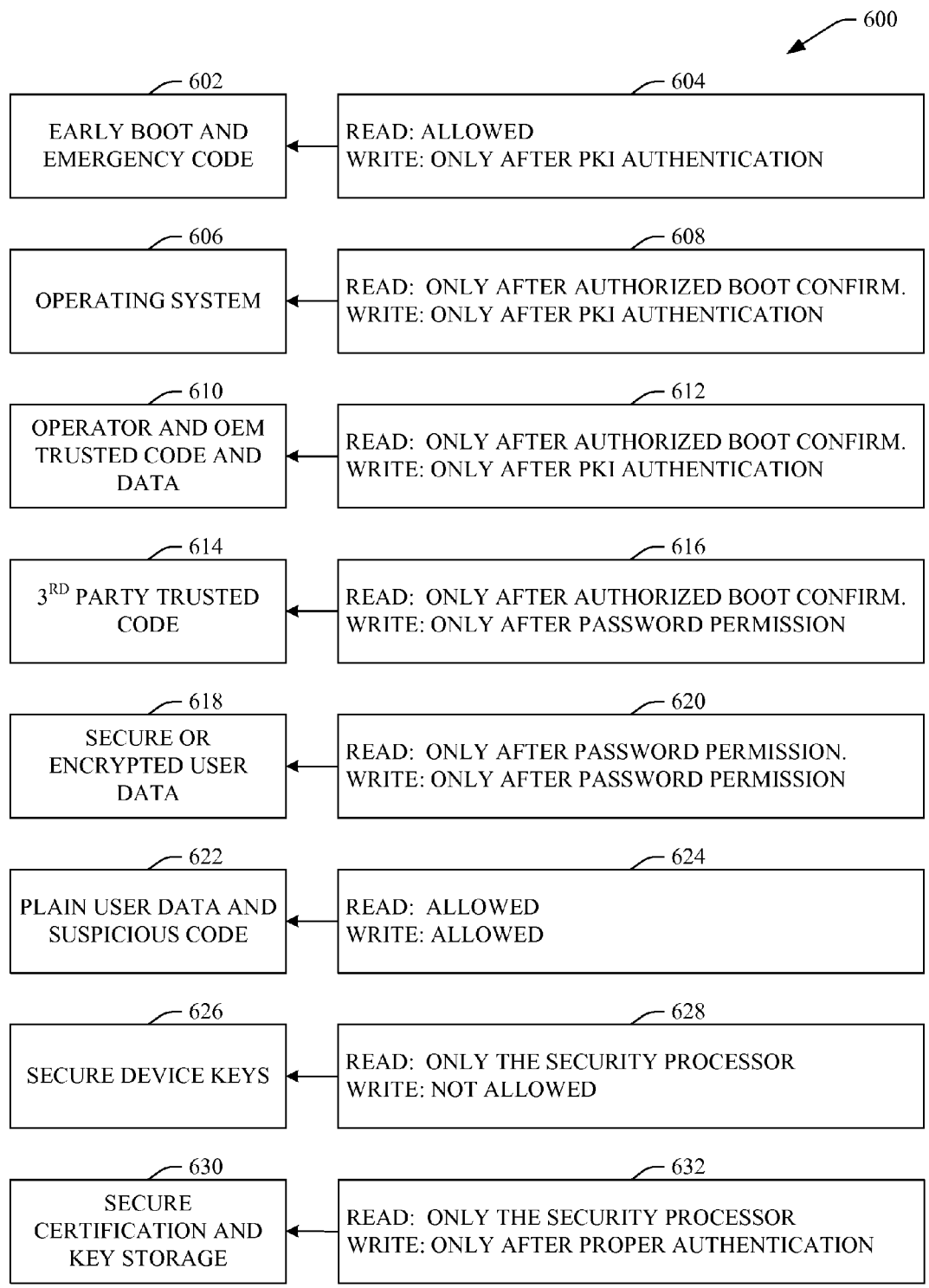
FIG. 6 illustrates a diagram of a partitioned memory in accordance with an aspect of the disclosed subject matter.

For example, FIG. 6 illustrates secure memory partitions 600 of a memory. The memory 208 can be non-volatile memory, such as flash memory, for example. Secure Partitioning can be utilized to protect essential data and code, secure sensitive information, and allow easy access to common public data. Secure Partitioning can allow separate access controls to different partitions of data which can be made available based on user, service provider, original equipment manufacturer (OEM), enterprise authentication, or any other type of authentication available. More specifically, as illustrated in FIG. 6, the memory space can be divided into multiple partitions with associated access rights. The access rights can distinguish between read and write (or erase) permissions. The access rights can also include the ability to change access rights as permissions are granted and/or denied, so that multiple users who have access rights to a shared partition can all access the shared partition.

Further, the access rights can support different security levels of authentication. Accordingly, some objects can utilize higher levels of protection than others. For example, the partition that stores the operating system can be protected more securely than a partition that stores a downloaded game. The access rights can also support remote users who do not assume that the host is trusted. Authentication of a remote user must work correctly even if the host is not trusted. In addition to the access rights, partitions can be made inaccessible when an associated mobile handset is not in a trusted state.

As shown in FIG. 6, the memory 600 can be partitioned into eight segments. The memory 600 may be partitioned into as many segments as needed, limited to either software or hardware. Each partition can contain specific read/write (or erase) access rights as shown at the right of FIG. 6. Each partition can also contain an access right that specifies an entity that can change the read/write (erase) access rights. The memory 600 can be volatile or non-volatile memory (e.g., flash memory), for example.

Specifically, early boot and emergency code 602 includes access rights such that read access can be allowed but write (or erase) can be allowed only after PKI authentication 604. The operating system 606 can allow read access only after authorized boot confirmation and write (or erase) access only after PKI authentication 608. The operator and OEM trusted code and data 610 can allow read access only after authorized boot confirmation and write (or erase) access only after PKI authentication 612. Third party trusted code 614 can allow read access only after authorized boot confirmation and write (or erase) access only after User Password Permission 616. Secure or encrypted user data 618 can allow read and write (or erase) access only after user password permission is received 620.

Plain user data and suspicious code 622 can allow read and write (or erase) access without any security constraints 624. Secure device keys 626 can allow only the security processor (not shown) read access and can prohibit write (or erase) access 628. Secure certification and key storage 630 can allow only the security processor read access and allow write (or erase) access only after proper authentication 632. The read and write (or erase) security constraints disclosed in FIG. 6 are just some examples of security constraints that can be applied to the secure memory partitions of the memory, and any security constraints can be applied to the partitions depending on the security access required and/or requested. Furthermore, life-cycle stages can also control the security functionality access. Life-cycle stages include, but are not limited to, the manufacturing stage, development stage, vendor stage, service provider stage, secure (end user) stage and returned materials stage. For example, the life-cycle stages can exhibit a one-way flow wherein anything done on a previous stage is fixed once a stage transition occurs. Further, the main purpose of having life-cycle stages is to provide the flexibility needed during the pre-user stages and at the same time to enforce the security required during the end user stage.

Figure 7:
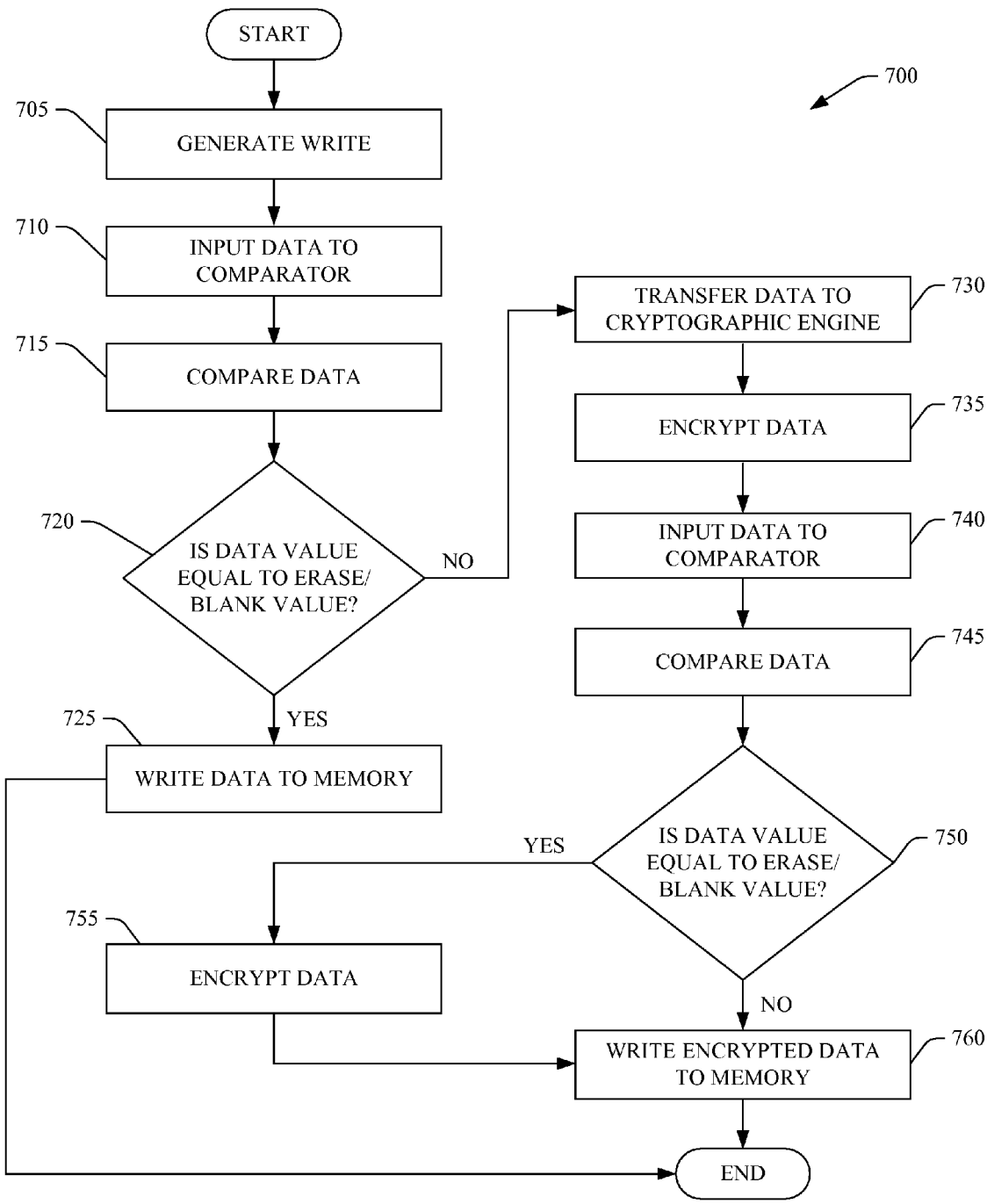
FIG. 7 illustrates a methodology of performing a memory write by a processor in accordance with an aspect of the subject matter disclosed herein.
Figure 8:
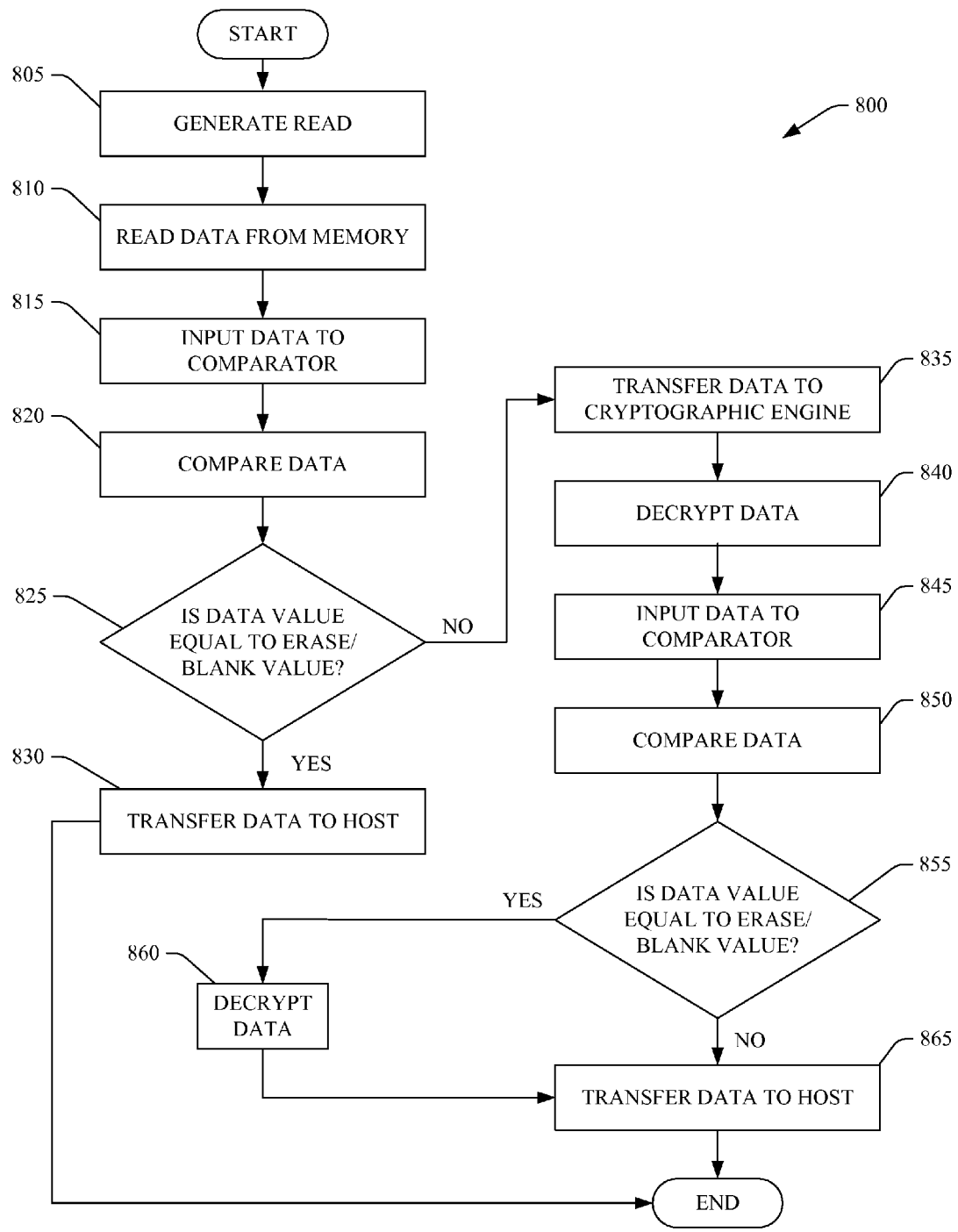
FIG. 8 illustrates a methodology of performing a read request from memory in accordance with an aspect of the subject matter disclosed herein.

FIGS. 7-8 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, a methodology of performing a memory write by a processor is illustrated. At 705, a processor can generate a write request. The processor can be a host processor, for example. At 710, data can be input to a comparator. At 715, the inputted data can be analyzed or compared by the comparator. At 720, a determination is made as to whether the data associated with the write request has a value equivalent to a value associated with an erased or blank memory location (e.g., bits of data being sent to flash memory are all ones). If the data associated with the write request has a value equivalent to a value associated with an erased or a blank memory location, then at 725, the data can be transferred, that is, written, to the specified memory location. The memory location can be specified by the host processor, for example. If the data associated with the write request does not have a value equivalent to a value associated with an erased or blank memory location, then, at 730, the data can be transferred to a cryptographic component. At 735, the cryptographic component can encrypt the data. At 740, the encrypted data can be input to a comparator. At 745 the comparator can compare or analyze the data. At 750, based on the analysis of the comparator, a determination can be made as to whether the data value of the encrypted data is equivalent to the value of that associated with an erased or a blank memory location. If the encrypted data has a value equivalent to the value associated with an erased or a blank memory location, then, at 755, the encrypted data can be encrypted again. At 760, the re-encrypted data can be written to memory at the specified memory location. If, at 750, it is determined that the encrypted data has a value that is not equivalent to a value associated with an erased or blank memory location, then, at 760, the encrypted data can be written (e.g., transferred) to memory at the specified memory location. At this point, the methodology ends.

Turning now to FIG. 8, a methodology of performing a read request from memory in accordance with the disclosed subject matter is illustrated. At 805, a read request can be generated. The read request can be requested by a host processor, for example. At 810, data can be read from a specified memory location in memory. At 815, the data can be input to a comparator. The comparator can be included in a security processor, for example. At 820, the comparator can analyze the data. At 825, a determination can be made by the comparator as to whether the data has a value equivalent to a value associated with an erased or a blank memory location (e.g., bits set to all ones with regard to flash memory), or actual data (e.g., data that has a value that is not equivalent to a value associated with erased/blank memory). If the data has a value that is equivalent to a value associated with an erased or a blank memory location, then, at 830, such data can be transferred to the host processor, and the methodology can end. If the data has a value that is not equivalent to the value associated with an erased or a blank memory location, then at 835, the data can be transferred to a cryptographic component. At 840, the cryptographic component can decrypt the data. At 845, the decrypted data can be input into a comparator. At 850, the decrypted data can be compared or analyzed. At 855, a determination can be made as to whether the data value of the decrypted data is equivalent to a value associated with an erased or a blank memory location. If the data value of the decrypted data is equivalent to a value associated with an erased or a blank memory location, then, at 860, the decrypted data is decrypted again. At 865, the re-decrypted data can be transferred to the host processor. If the decrypted data does not have a value equivalent to a value associated with an erased or blank memory location, then, at 865, the decrypted data can be transferred from the comparator to the host processor. At this point, the methodology ends.

It is to be appreciated that the above methodologies have been described with each component (e.g., cryptographic engine) having only one buffer. However, the disclosed subject matter is not so limited. Each component claimed herein can include sufficient buffers to permit the processing of data and other information in accordance with the disclosed subject matter.

Further, it is to be appreciated that the memory can include volatile memory (e.g., RAM, SRAM, and the like) and non-volatile memory (e.g., ROM, PROM, flash, and the like).

As utilized herein, terms "component," "system," "module," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g. explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 9:
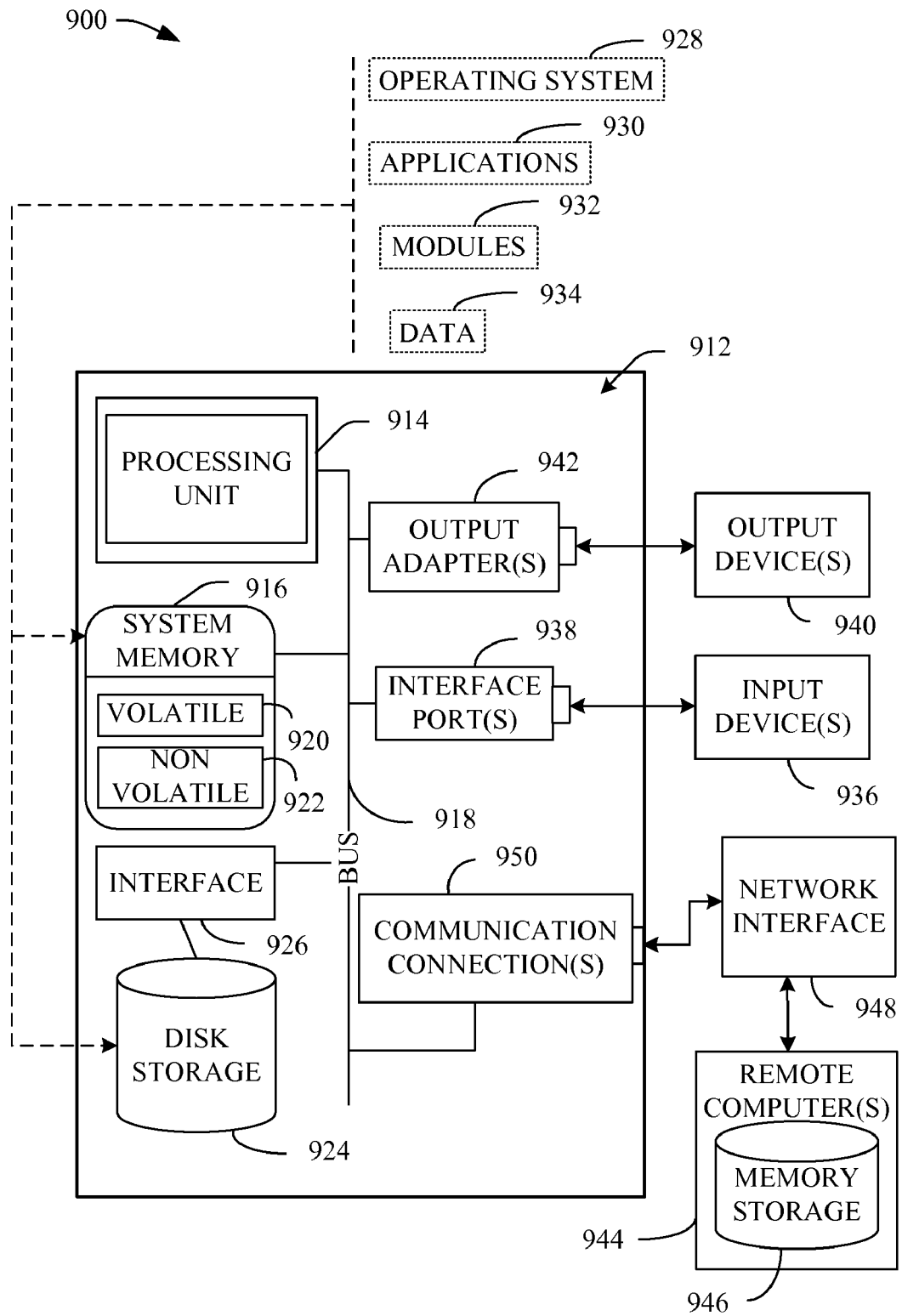
FIG. 9 is a schematic block diagram illustrating a suitable operating environment.
Figure 10:
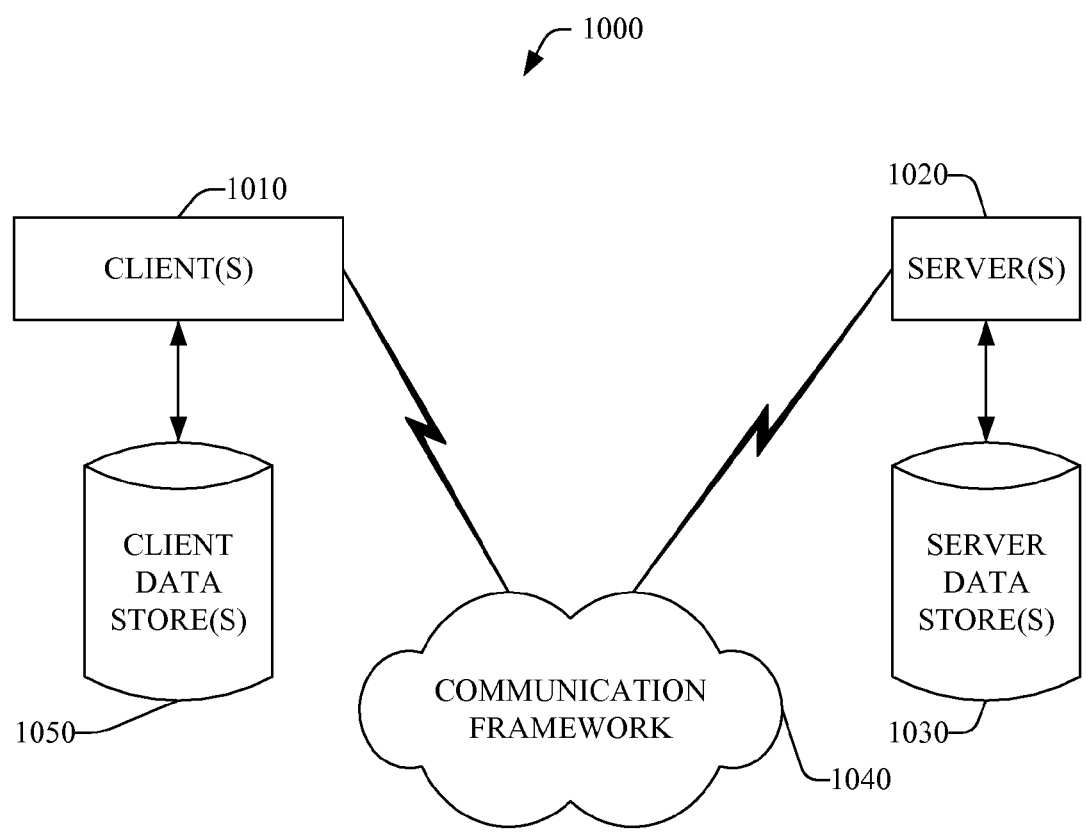
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 9, a suitable environment 900 for implementing various aspects of the claimed subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include ROM, PROM, electrically programmable ROM (EPROM), electrically erasable programmable ROM (EEPROM), or flash memory. Volatile memory 920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

It is to be appreciated that FIG. 9 describes software that acts as an intermediary between users and the basic computer resources described in the suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the claimed subject matter can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A method for facilitating securing information in a memory, comprising:
    receiving information associated with at least one of actual data, an erased memory block, a blank memory block, data having a value equivalent to a value associated with an erased or blank memory block from at least one of a host processor or the memory;
    comparing the information associated with actual data after the at least one of encrypting or decrypting;
    performing a first process on the information received when the information is associated with actual data, or performing at least one other disparate process when the information is associated with at least one of an erased memory block a blank memory block, or data having a value equivalent to a value associated with an erased or blank memory block; and at least one of re-encrypting or re-decrypting the information associated with actual data that has been at least one of encrypted or decrypted, if the information has a value equivalent to a value associated with at least one of an erased memory block or a blank memory block.

2. The method of claim 1, further comprising:
    at least one of encrypting or decrypting the information associated with actual data; comparing the information associated with actual data after the at least one of encrypting or decrypting; transferring the information associated with actual data to at least one of the host processor or the memory.

3. The method of claim 1, further comprising:
    at least one of transferring the information associated with data having a value equivalent to a value associated with an erased or blank memory block to the memory if such information has a value equivalent to an erased memory block or a blank memory block, or transferring the information associated with at least one of an erased memory block or a blank memory block to the host processor, if such information has a value equivalent to a value for at least one of an erased memory block or a blank memory block.

4. The method of claim 1, further comprising:
    soliciting authentication information from an entity;
    receiving authentication information from the entity;
    determining a level of authentication associated with the entity based in part on the received authentication information; and
    controlling a level of access rights based in part on the level of authentication associated with the entity.

5. The method of claim 1, further comprising a security processor that receives the information from the at least one of the host processor or the memory.

6. The method of claim 1, the security processor further comprises a comparator that compares the received information.

7. The method of claim 1, the memory is at least one of volatile or non-volatile memory.

8. The method of claim 7, the non-volatile memory is at least one of flash memory, read only memory, or programmable ROM.

9. A system that facilitates processing of information, comprising:
    a host processor that generates at least one of a read command or a write command; and
    at least one other processor associated with the host processor that receives information, distinguishes between information associated with actual data and information associated with at least one of an erased memory location or a blank memory location, and performs disparate processes on the information received based on a type of information, wherein one process includes re-encrypting or re-decryptinq the information associated with actual data that has been encrypted or decrypted, when the information has a value equivalent to a value associated with an erased memory block or a blank memory block.

10. The system of claim 9, the at least one other processor further comprises a comparing component that analyzes information received and distinguishes between the information associated with actual data and the information associated with at least one of an erased memory location or a blank memory location.

11. The system of claim 9, the at least one other processor performs a first process on the information associated with actual data, the first process is associated with at least one of encryption of the information or decryption of the information.

12. The system of claim 11, further comprising a comparing component that analyzes the information associated with actual data subsequent to the first process and determines whether the information has a value equivalent to the value of information associated with at least one of an erased memory location or a blank memory location.

13. The system of claim 12, the at least one other processor performs at least one other process on the information associated with actual data, which has been subject to the first process, if the value associated with the information subsequent to the first process is equivalent to the value of information associated with at least one of an erased memory location or a blank memory location, the at least one other process is associated with at least one of encryption of the information or decryption of the information.

14. The system of claim 11, the at least one other processor performs a second process on the information associated with the at least one of an erased memory location or a blank memory location, the second process is associated with at least one of a transfer of information associated with an erased memory location or a blank memory location to the host processor, or a transfer of information that has a value equivalent to an erased or a blank memory location to memory.

15. The system of claim 9, further comprising a memory that is at least one of volatile memory or non-volatile memory.

16. The system of claim 15, the non-volatile memory is at least one of flash memory, read only memory, or programmable ROM.

17. The system of claim 9, the at least one other processor further comprises a cryptographic component that utilizes cryptographic accelerators and tools associated with at least one of symmetric, asymmetric, or hashing.

18. The system of claim 9, the at least one other processor further comprises an authentication component that solicits authentication data from an entity and determines access rights to the memory based in part on the authentication data received from the entity, and the at least one other processor controls access to the memory based in part on the level of authentication associated with the authentication data.

19. A system that facilitates securing data in a memory, comprising:
means for authenticating an entity to determine a level of access rights with regard the memory to be granted to the entity; means for receiving data associated with at least one of valid data, an erased memory location, a blank memory location, or data having a value equivalent to a value associated with an erased memory location or a blank memory location from at least one of a host processor or the memory; means for comparing the data received; means for performing at least one of encryption of valid data or decryption of valid data; means for comparing at least one of encrypted valid data or decrypted valid data; means for performing at least one of re-encryption of encrypted valid data or re-decryption of decrypted valid data, when the encrypted valid data or decrypted valid data has a value equivalent to a value associated with at least one of an erased memory, a blank memory, or an erase command; means for processing data associated with at least one of an erased memory, a blank memory, or data having a value equivalent to a value associated with an erased memory location or a blank memory location, such that the data has a value associated with, or representative of, at least one of an erased memory, a blank memory; and means for presenting the data associated with at least one of valid data, an erased memory, a blank memory, or data having a value representative of an erased memory location or a blank memory location to at least one of the host processor or the memory.

* * * * *